Jan. 19, 1965 H. BRANDT 3,166,705
AUTOMATIC VOLTAGE CONTROL FOR ELECTRICAL PRECIPITATORS
Filed Feb. 13, 1961 6 Sheets-Sheet 1

INVENTOR.
HERBERT BRANDT
BY
AGENT

United States Patent Office 3,166,705
Patented Jan. 19, 1965

3,166,705
AUTOMATIC VOLTAGE CONTROL FOR
ELECTRICAL PRECIPITATORS
Herbert Brandt, Rothemuehle, near Olpe, Westphalia,
Germany, assignor to Apparatebau Rothemuehle Dr.
Brandt & Co., Rothemuehle, near Olpe, Westphalia,
Germany, a corporation of Germany
Filed Feb. 13, 1961, Ser. No. 88,796
13 Claims. (Cl. 323—66)

The present invention relates to electrical precipitators, and more particularly to a system for automatically regulating the voltage of such precipitators.

When particles suspended in a gas are exposed to gas ions in an electrostatic field, they will become charged and migrate under the action of the field. This phenomenon has been used in electrical precipitators wherein the gas is ionized and suspended particles are collected, which involves the production of an electrostatic field through which the gas is led to cause charging and migration of dust particles in the gas, the retention of the gas to permit the particle migration to a collection surface, the prevention or re-entrainment of the collected particles and the removal of the collected particles from the equipment, the gas leaving the equipment purified of its dust particle content. Such precipitators have been used industrially, for instance, wherever it is desired to purify gases or to recover therefrom valuable particulate substances.

It is a primary object of the present invention to provide a control system for maintaining the voltage of the electrostatic field of electrical precipitators over extended periods of time in such a manner that the average electrical power or watt-hour consumption of the precipitator is increased within certain adjustable limits by the sparking intensity whereby an optimum precipitating efficiency is obtained for a given time period.

Electrical precipitators with the following characteristics are known:

(1) Control systems responsive to each sparking to lower the voltage until sparking ceases.

(2) Counting devices recording the number of sparkings in a predetermined period of time and correspondingly raising or lowering the voltage at a variable transformer, depending on whether the number of the counted sparks is above or below a certain limit.

(3) Systems cutting the voltage supply for an instant at each sparking and restarting it immediately at a lower voltage. The voltage is thereupon increased again until the electric power of the precipitator reaches a predetermined value. A condenser is charged during each current interruption to charge the grid of a rectifier tube connected to the condenser, thus causing after a certain time an anode current which puts the entire control system out of service.

The first- and last-named control systems which are responsive to each spark have the disadvantage of causing a considerable decrease in the overall efficiency of the precipitator, due to the frequent lowering and cutting off of its voltage. Taking flue gas precipitators, for instance, the collection efficiency decreases by just about the same percentage as the voltage is lowered. Therefore, the average efficiency decreases in the same ratio as the average operating voltage. With the control systems (1) and (3), the average voltage may be more than 20% less than the highest possible voltage.

Since maximum collection efficiency is obtained only if the precipitator operates as close to sparking voltage as practicable, it is preferred to use controls which do not respond to each sparking, as set forth under (2) hereinabove. This enables operation of the precipitator at somewhat higher average voltage per time unit and correspondingly higher collection efficiency than obtainable with systems (1) and (3). This, however, is possibly only if the number of sparks in the time unit is not too high. In the latter case, the counting device will immediately lower the voltage even if the intensity of the sparks is very low and would have no disadvantageous influence on the overall collection efficiency.

The present invention is based on the insight that sparking may be of different intensities and that only powerful sparks disturb the operation of electrical precipitators. Powerful sparks cause a considerable decrease in the collection efficiency and produce stationary or running arcs which cause the electrical current safety devices to put the precipitator out of service. On the other hand, sparks of lower intensity have a rather favorable influence on the ionization of the gases so that the collection efficiency of the precipitator reaches an optimum value if the product of the number and the intensity of the sparks within a time unit reaches a predetermined value.

Thus, if the voltage of the precipitator is so controlled that the necessary favorable range of the consumption or excess consumption of current or watt-hours, which results from the number and the intensity of sparks within a time unit, is not maintained, the optimum collection efficiency of the precipitator cannot be reached.

It is, therefore, the object of the present invention so to maintain the voltage of the precipitator during extended periods of time within the spark limit that the average current or watt-hour consumption of the precipitator, which is due to the intensity of the sparks, is increased within certain adjustable limits to obtain an optimum for the average value of the collection efficiency, within the time unit.

This object is obtained by making the voltage control system for the electrical precipitator responsive to the product of the number and the intensity of the sparks within a time unit.

In practice, account must be taken of the fact that the electric consumption of an electrical precipitator at a given voltage depends on varying operating conditions. In flue gas precipitators, for instance, the electric power consumption varies in dependence on the fuel composition, combustion conditions, dust content, moisture content, temperature of the gas, and other factors.

The above and other objects, advantages and features of this invention will be more fully explained in the following detailed description of a preferred embodiment thereof, taken in conjunction with the accompanying drawing, wherein FIG. 1 schematically shows the parameters of the current meter circuits.

Figure 2:
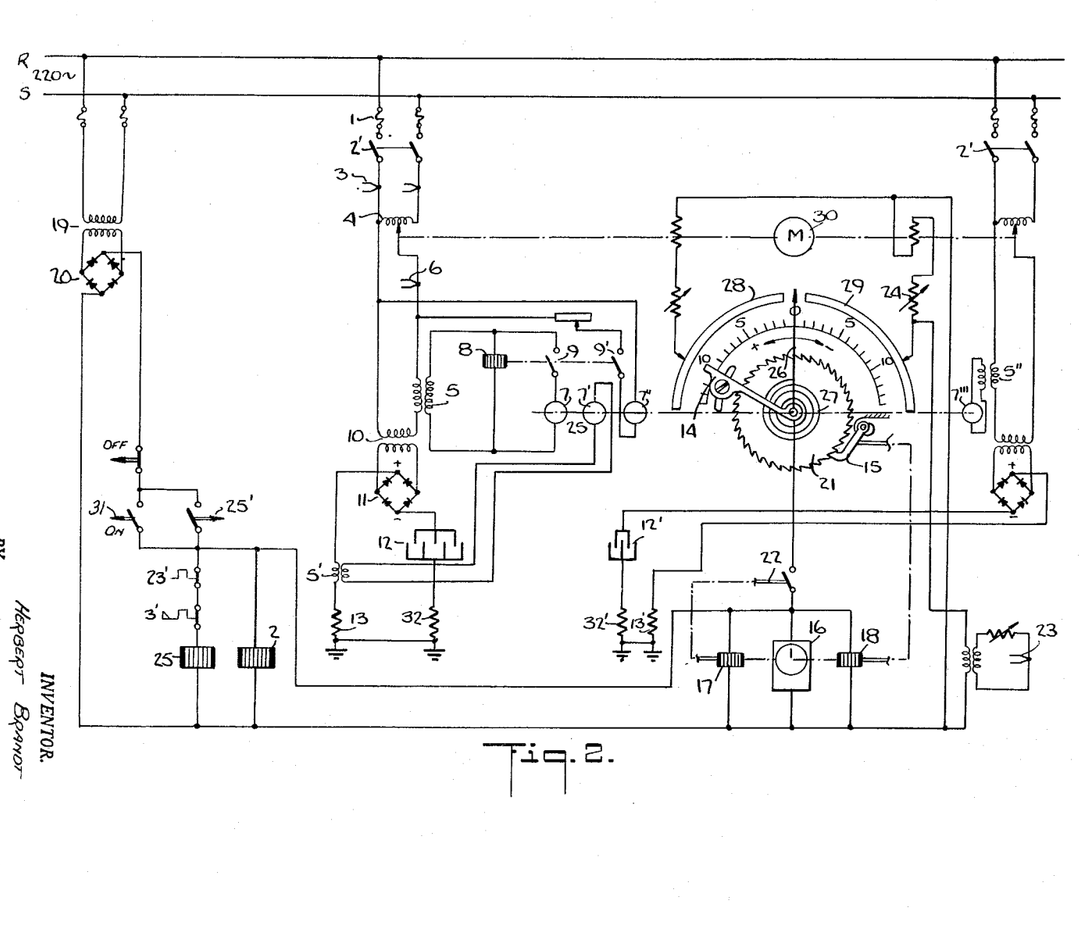
FIG. 2 schematically shows a control system for the operating voltage of an electrical precipitator according to one embodiment of the invention.

Referring now to the drawing, and more particularly to FIG. 2, there is shown a low voltage circuit with A.C.

phases R and S, to which there is connected variable voltage transformer 4. Fuses 1 are interposed between main contactor 2 and the alternating current lines R and S, while thermal overload relay 3 is connected between the switch and the transformer. Another overload relay 6 is arranged between the transformer 4 and a high tension transformer 10 to protect the system.

High-tension direct current is provided to the discharge electrodes of an electrical precipitator 12 from the transformer 10 via rectifier 11 whose positive pole is grounded through a protective resistance 13. The collecting electrodes of the precipitator are grounded.

The control system of the present invention is applicable to any conventional plate or pipe precipitator and since the structure of the precipitator forms no part of the present invention, it has been shown only schematically at 12.

When the apparatus is put into operation by actuation of switch 31, voltage is supplied to auxiliary relay 25. The contact 25' of relay 25 is closed and, thus, voltage is supplied simultaneously to the main relay 2 and the timing mechanism 16 by means of impulse relays 17 and 18. The contacts 2' of the main relay then start operation of the H.T. rectifier 11.

In a suitable place in the circuit, there is connected an instrument which is responsive to any variation in the current. In the illustrated embodiment and preferably, this instrument is connected between the variable transformer 4 and the H.T. transformer 10.

The current variation recording instrument illustrated herein is a current transformer 5 whence a metering current circuit leads to meter 7 which integrates the current or power consumption within a time unit and produces a deflection corresponding to the integrated parameter.

An overload relay 8 is connected in parallel in the metering current circuit which so actuates a contact 9 that the circuit is closed only as long as the current is above an adjusted value. The instrument 7, thus, only measures the time integral of the total current or of the wattage, depending on the type of instrument used, during the time when sparking occurs.

The rapidity of responding of relay 8 may be short compared to the duration of sparking. It may be intentionally adjusted so that very short and small sparks, which do not disturb the operation of the precipitator but even improve it, do not actuate the relay at all and are thus not recorded by the instrument 7.

In accordance with the present invention, it would suffice to record only the current peaks at sparking, which are above the permissible current $I_{zul}$. For this purpose, a second current meter 7'' subtracts a constant adjustable current $I_{zul}$ from the main current I, the second meter 7'' operating simultaneously with, but in opposite direction to, meter 7. This constant current may be supplied to relay 8 by closing switch 9' during the sparking period $\Delta t$.

Figure 1:
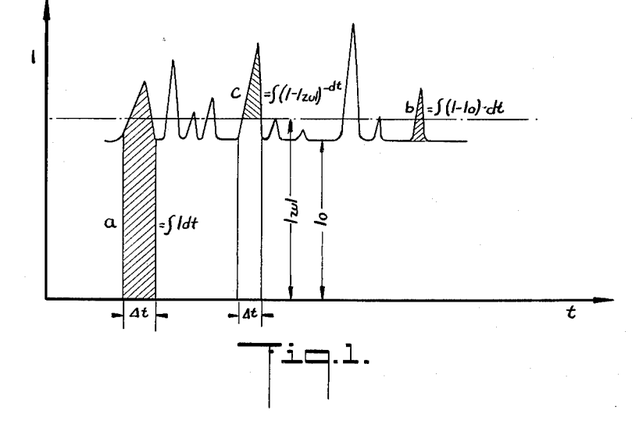

FIG. 1 shows schematically how the parameters are recorded by the different current meter circuits. The hatched areas show the electric power or current consumption of meter 7, $a = \int I dt$, which is in operation only during sparking period $\Delta t$ via overload relay 8.

$b = \int (I - I_o) dt$ may be obtained, for instance, by the current measurement of meter 7' connected with the D.C. current circuit of precipitator 12 via current transformer 5'.

$c = \int (I - I_{zul}) dt$ results from the connection of a second meter 7'' in the circuit, operating in opposite direction to meter 7, as shown in FIGURE 2.

To avoid recording of current fluctuations caused by varying operating conditions rather than by sparking, the current meter 7'' may also be connected in the circuit in the form of a measuring bridge between precipitator 12 and a smaller comparative precipitator 12'. For that purpose the top of meter 7'' would be connected to the top of resistor 32' and the bottom of the meter to the top of resistor 32.

It would also be possible to connect the comparative precipitator 12' in parallel with the precipitator 12 to obtain a conventional bridge connection. In this case, if the comparative or test precipitator 12' is operated with the same gas and dust conditions as the main precipitator 12, it may be so adjusted by means of changing the electrode distances that no current flows through meter 7'' during normal current consumption of precipitator 12. In such a circuit, resistances 32 and 32' may be adjustable.

Finally, the current in test precipitator 12' may be conducted via transformer 5'' to meter 7'''' and coupled on a common shaft with the meter 7 in a direct connection via transformer 5 so that a difference is obtained between the current in the main precipitator 12 and such a multiple of the test current that the meter records only the current consumption of the sparking in the main precipitator.

A mechanical or electrical connection 25 is arranged between the metering means (7, 7' and 7'') and the switching device which operates the voltage adjustment, the connection operating the pointer 26 of the switching or control device. The pointer 26 may be identical with the pointer of meter 7.

The control or switching device comprises the pointer 26, which is biased by spring 27 against an adjustable stop 14. A pawl 15 engages the ratchet wheel 21 which is fixedly connected with pointer 26. Depending on its position, the pointer 26 is in electrical contact either with conductor 28 or conductor 29, or it rests in a gap therebetween.

The contact of the pointer with either conductor closes an auxiliary circuit to motor 30 operating the adjustment of the variable control transformer. Depending on whether the pointer contacts conductor 28 or 29, the motor is rotated in one or the other direction and thus produces an increase or a reduction in the voltage. The rotational speed of the motor may be manually adjusted in dependence on the operating conditions by adjusting the resistances 24 provided in the auxiliary motor circuit.

The auxiliary circuit is fed by the low-tension current supply circuit via transformer 19 and rectifier 20. Timing mechanism 16 is connected in the auxiliary circuit to operate at adjustable time intervals the switch 22 via relay 17 for short periods sufficient to adjust the variable transformer. The closing of the switch 22 operates the pawl 15 via relay 18 so that spring 27 again positions the pointer 26 with ratchet wheel 21 in the end position at stop 14.

Conductor 29 may be divided into several parts, each of which may reduce the voltage of the variable transformer via different resistances, such as 24, at different speeds and, thus, in different steps.

Also, conductors 28 and 29, or only conductor 29, may be so formed as resistances that the resistance of the auxiliary circuit differs in accordance with the position of the pointer whereby different adjustment steps of the variable transformer may be obtained.

Time relay 23 is operated parallel and simultaneously with the auxiliary circuit for the reduction of voltage and its bimetallic strips are heated during the impulse period of relay 17. If the theoretical value is frequently surpassed by considerable amounts, the timing relay 23 responds and operates the rest contact 23'. This actuates the auxiliary relay 25 and its operating contact 25' places the entire current supply system out of service.

Any suitable rectifier arrangement may be used for the production of high D.C. voltages, instead of the exemplified single phase bridge connection of the rectifier elements.

Figure 3:
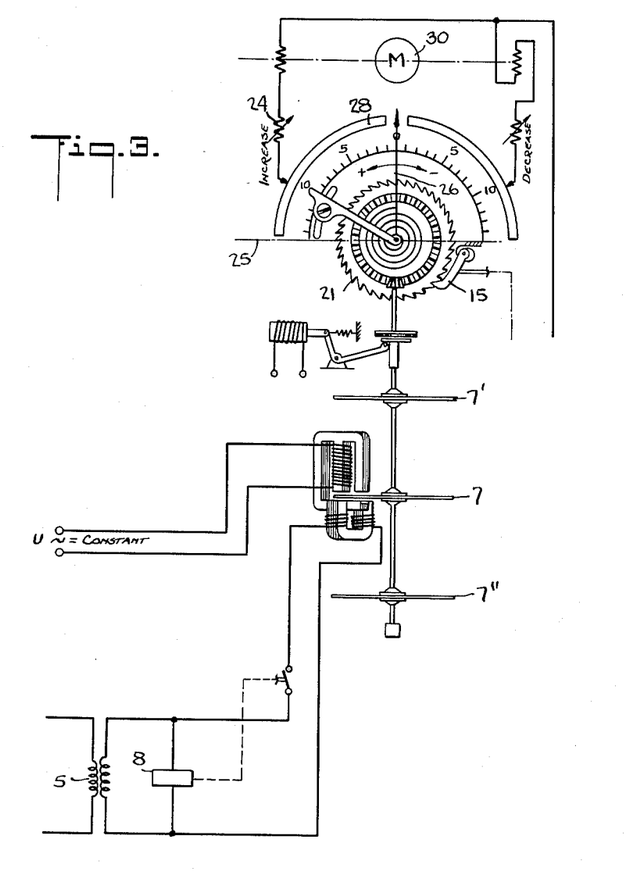
FIG. 3 shows the driving mechanism for the meter of the control system of FIG. 2.

FIG. 3 shows, for the meter system 7 of FIG. 2, a driving mechanism for the Ferraris disc of a three-phase four-wire current counter. According to the circuit of FIG. 2, the systems 7' and 7'' have analogous current and voltage coils on their driving magnets. The voltage coils of all counters are connected to the same constant alternating voltage.

The use of such a counter has the advantage that any standard type may be used for the purposes of the invention with only slight modifications. But commercially available excess current consumption meters, which register any excess consumption above an adjustable load limit on a second counter, may also be used. The load limit may be adjusted by a variable speed gear which may be actuated from the outside. This may be automatically done by means of a slow measuring device which only records the average effective value without the short load fluctuations caused by sparks or slight current reductions due to a short increase in the inner resistance of the precipitator in case of streaks within the gas.

The counter mechanism has a graduated scale which is designated as positive at the left side of the center line to indicate the area of voltage increase while the right side is designated as negative because it indicates the area of voltage decrease. Each graduation on the scale corresponds to a spark of average intensity. In the positive area, there is arranged an adjustable stop which is illustrated as being positioned at +10. This adjustment means that 10 sparks of average intensity are permissible within a period of a minute.

At the beginning of the adjustment period, the timing mechanism positions the pointer 26 at the stop 14 which is in alignment with graduation +10. Each electrical impulse caused by a spark in the precipitator moves the pointer to the right. At the end of the one-minute long adjustment period, the timing mechanism causes the adjustment of the variable transformer by one step. If the pointer is positioned in the positive area, the output voltage of the variable transformer is adjusted upwardly; if it is in the negative area of the scale, the output voltage is reduced and if the pointer is in the zero gap, no voltage change is made.

The output voltage may be adjusted at each step by 5 v., for instance. The extent of the pointer deflection may also be used, however, to control the amount of voltage change, and, thus, to produce adjustment steps of, say 10 v. or other voltages. In this case, it is possible to produce only constant voltage increase adjustments of 5 v., while the voltage decrease may be by 5 v., 10 v., 15 v. or intermediate value, depending on the deflection of the pointer. If the variable transformer has reached its maximum output, an end switch ensures that no further voltage increases are produced.

In another embodiment of the control system, the variable transformer may be adjusted by one step in given time units in the direction of a voltage increase while, within these time units, the meter 7 adjusts the variable transformer by one step in the direction of a voltage reduction in accordance with the sparking. Furthermore, these two opposite control impulses may be combined in an integrator so that only the resultant difference is used for the control of the voltage.

For instance, the impulse for a voltage increase is provided by a time relay, i.e. a timing mechanism with a switch, which actuates the motor in the direction of a voltage increase at adjustable time intervals and thus increases the voltage by an adjustable step.

Various features of control circuits within the scope of the present invention will be more fully explained in the following description of certain illustrated embodiments.

Figure 4:
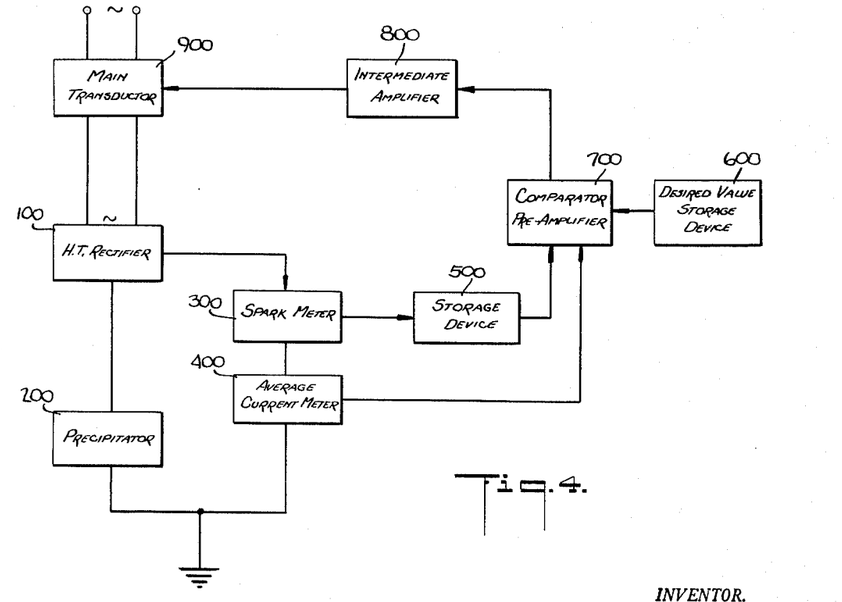
FIG. 4 is a schematic illustration of another embodiment of the invention.

FIG. 4 schematically shows an entire control circuit, with the various circuit elements being indicated in correspondingly labeled blocks. 100 shows a high-tension rectifier through which current is fed to the electrical precipitator 200. Also connected to rectifier 100 are actual spark meter 300 and the average current meter 400. The storage device 500 receives information from meter 300 and does establish the actual value of the number and intensity of sparks, which is fed to a comparator and pre-amplifier arrangement 700. The desired value is fed to the comparator from device 600 so that the actual and desired values may be compared at 700, the comparison value being fed through an intermediate amplifier 800 to the main transductor 900, effecting there an analogous controlling of the main circuit.

A branch line feeds a signal from the average value meter 400 to the comparator 700 so that deviations from the average may be taken into account.

Figure 5:
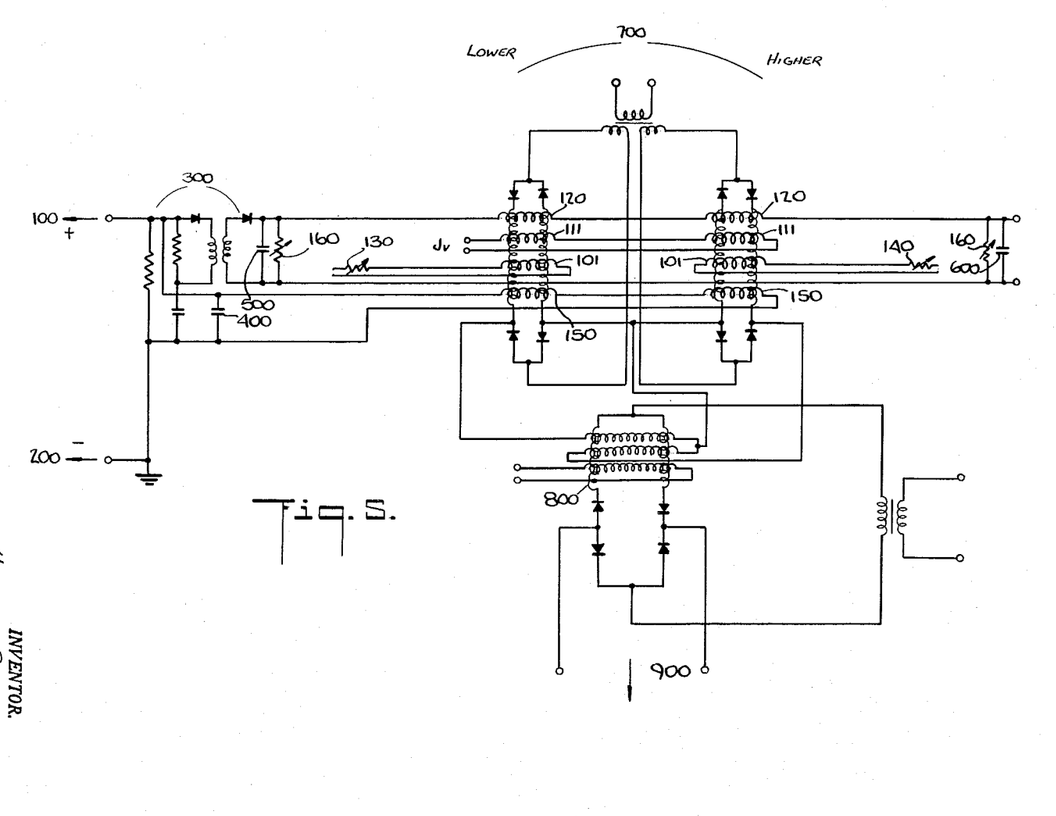
FIG. 5 shows one portion of the circuit of FIG. 4 wherein the comparison is made between the desired and actual voltage.

FIG. 5 shows, in more detail, the portion of the circuit of FIG. 4 wherein the comparison between the actual and the desired values is made. 500 and 600 show the actual value and desired value condensers, respectively. 101 are feedback coils which influence the positioning of the push-pull amplifier characteristic lines, 111 are additional coils of the magnetic amplifiers to establish the operating point and 120 are the comparator coils of the magnetic amplifier. 130 and 140 are adjustable resistance elements which serve to change the positions of the characteristic lines of the push-pull amplifier. 150 indicates additional pre-magnetizing coils which instantaneously interrupt the voltage increase control in case of an electric arc flashover and initiate a lowering of the voltage, these coils receiving a signal from meter 400, as indicated in FIG. 4. However, this interrupter responsive to excess sparking intensity may also be arranged at intermediate amplifier 800 and would there produce an even more rapid adjustment of the control circuit. However, the control arrangement will operate more smoothly if the interrupter is mounted on the amplifier 700, as illustrated. Such a system takes into account the time constants of the transductors.

160 designates high-ohmic discharge resistance elements which serve to limit the loads on condensers 500 and 600, and thus make it possible continuously to compare the two voltages.

In this transductor circuit, the sparks are integrated in the form of their measured values in their respective storage devices which may, for instance, be condensers. The voltage at these condensers increases in correspondence with the number, duration and intensity of the sparks. On the other hand, the constant impulses which give the desired values are stored on their condenser. The two condensers are connected through a pre-magnetizing coil of a magnetic amplifier. Depending on the load of the two condensers, a voltage differential appears therebetween, which opens or closes the amplifier. When the constant, desired value impulses are greater, the magnetic amplifier is opened and controls the main transductor so as to increase the voltage. As the actual value impulses, which are caused by spark impulses, increase, the voltage of the actual value impulse-receiving condenser finally overtakes the voltage of the desired value impulse-receiving condenser so that the amplifier controls the main transductor so as to decrease the voltage supplied to the precipitator.

Figure 6:
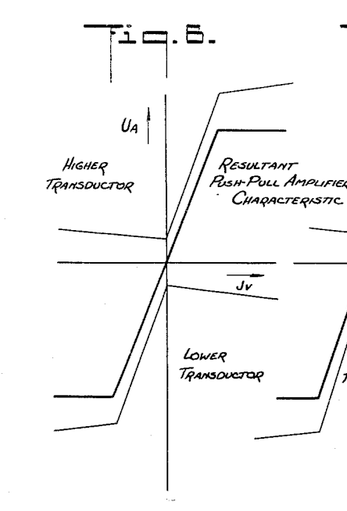
FIG. 6 shows the usual characteristic lines of two magnetic amplifiers in push-pull arrangement.
Figures 7, 8:
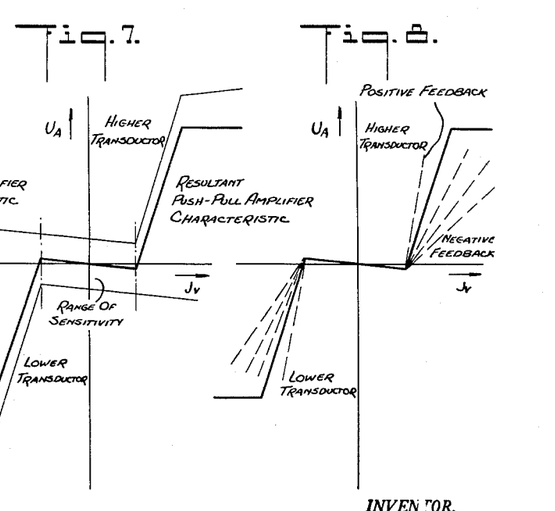
FIG. 7 illustrates the range of insensitivity obtained by a constant pre-magnetization.
FIG. 8 shows the positional change of the characteristic lines of the amplifiers of FIG. 6 by means of adjustable resistances.

To obtain a range of insensitivity wherein the comparator-amplifier 700 issues no control signals to the main transductor 900, the invention provides two magnetic amplifiers with a D.C. output in push-pull arrangement. FIGS. 6 and 8 illustrate the characteristic lines of two such amplifiers, FIG. 6 showing the usual lines, FIG. 7 indicating the range of insensitivity obtained by a constant pre-magnetization and FIG. 8 illustrating the positional change of the push-pull amplifier characteristic lines by means of an adjustable resistance element.

As shown in FIG. 7, if the two common amplifier characteristic lines are relatively moved by a constant pre-magnetization of the same size through another pre-magnetizing coil, a corresponding range of insensitivity is obtained and it is also possible to permit a predetermined number of sparks of average intensity within this range, or instance 5 to 15 sparks per time unit. If the number of sparks exceeds 15, the voltage of the actual value-receiving condenser is preponderant and the controls operate o lower the voltage fed to the precipitator. If the number of sparks is less than 5, the voltage of the desired value-receiving condenser is preponderant and produces a higher voltage feed. The permissible range of sparks per time unit may be simply enlarged or decreased by adjusting the constant pre-magnetization.

As indicated in FIG. 8, an additional feedback on the two push-pull amplifiers in connection with an adjustable resistance element produces in a known manner a positional change in the characteristic lines of the amplifiers. This additional coil and the associated resistance elements are preferably adjusted separately so that the control of the voltage increase may be effected slowly, for instance, while the voltage decrease is obtained rapidly.

In the case of an electric arc or short circuits, the main control transductor may be actuated directly by the average current meter circuit through the first and intermediate amplifiers.

Figure 9:
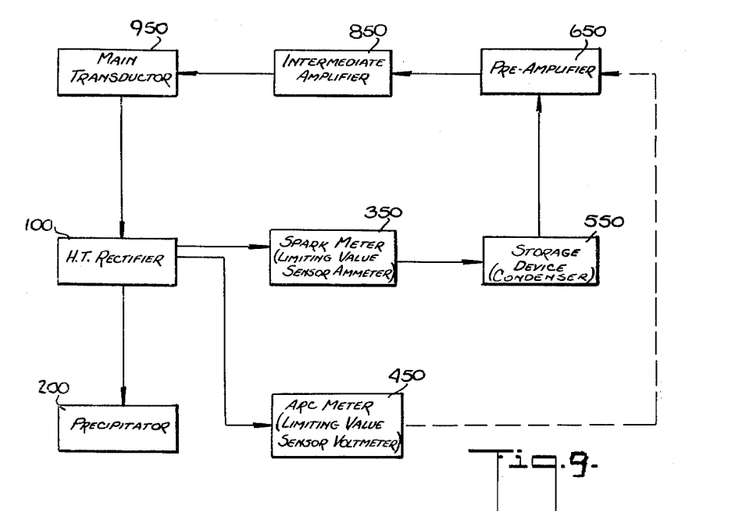
FIGS. 9 and 10 illustrate another voltage circuit control system according to the invention.
Figure 10:
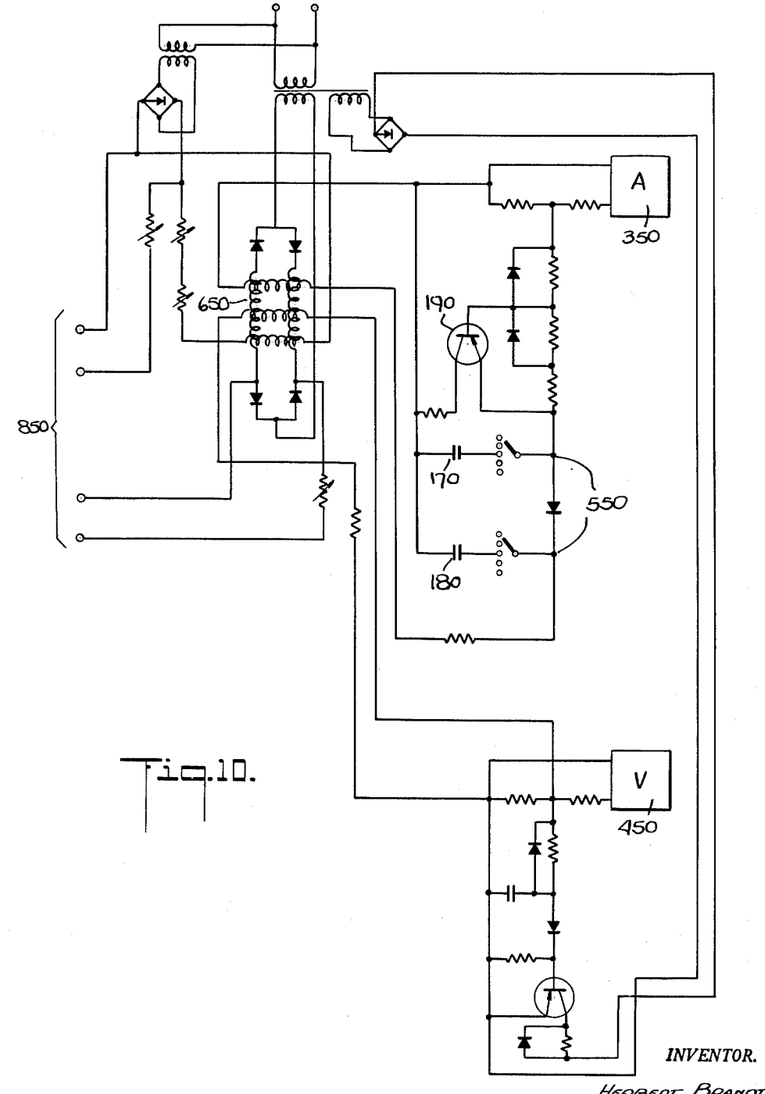

FIGS. 9 and 10 illustrate a modified control circuit wherein the number and intensity of sparks per time unit are received by limiting value sensors 350 and 450. This measuring value is stored by a corresponding discharge of a condenser 550 and is fed over transductor pre- and intermediate amplifiers 650 and 850 to the main control transductor 950 which adjusts the voltage fed to the precipitator 200 through H.T.-rectifier 100. In this manner, the precipitator voltage is continuously increased by transductor means, the control speed being adjustable, until the current has reached the value to which the first limiting value sensor has been adjusted. At most, this value may be the nominal current at the high-voltage rectifier or any other value which has proved to be an optimum for the operation of the precipitator. Each impulse which causes the indicator of the meter to swing beyond the adjustable indicator of the limiting value sensor is received as a spark.

When the adjusted limiting value is exceeded, the increase in the voltage is interrupted. After a short, adjustable interval, during which the voltage slowly decreases, it begins to increase again. This continuous, slowly proceeding sensing of the sparking limits produces a voltage control which greatly improves the operating efficiency of the precipitator.

The second limiting value sensor, which is mounted in the voltage meter at the primary, produces a very rapid closing of the main control transductor as soon as arcs and other permanent short circuits occur in the precipitator. The precipitator voltage and current consumption are reduced to minimal values so that arcs are safely eliminated. Thereafter, the main amplifier is again controlled upwardly. This increasing in voltage is more rapid than above described upward controlling, it is continuous and not suddenly, as with conventional relay switches. The voltage increase is so smooth that no arcing results, as is often the case when relays are switched on.

In metering the arcs, use is made of the phenomenon that permanent arcs considerably reduce the voltage of the high-voltage transformer. Therefore, if the primary voltage is lower than the value set with an adjustable indicator of the limiting value sensor on the voltmeter at the primary, the arc extinction is operated. The actuating voltage is so selected at the automatic actuating means that it definitely lies above the voltage resulting from a short circuit in the precipitator. The limiting value indicator is then adjusted to an intermediate value.

If a short circuit occurs in the precipitator, which cannot be eliminated even by closing the main control transductor, for instance, a broken discharge wire, an alarm relay is actuated in the automatic actuating means after about 10 seconds. The alarm relay may operate either to indicate only or actually to control the circuit.

Referring more particularly to the circuit diagram of FIG. 10, the operating value or point is predetermined by suitably adjusting the pre-magnetization of the lower coil of pre-amplifier 650 whereby the intermediate amplifier 850 and the main control transductor 950 are so controlled in conjunction with the upper coil of the pre-amplifier that, after the control system has been actuated, the voltage is automatically adjusted in the direction of the highest possible initial voltage of the rectifier 100 and thus of the operating voltage of the precipitator 200.

Normally, the limiting value sensor 350 of the ammeter at the primary or secondary is adjusted to the nominal current of the high-voltage rectifier. But any other value below the nominal one may be used if such value has proved to be an optimum under specific operating conditions. If no sparks occur in the precipitator until the adjusted value has been reached, the increase in the voltage is terminated only when the adjusted value has been reached, which is normally at the nominal current.

If sparks occur during the voltage increase, which exceed the adjusted limiting value, the following occurs (which is the same as when the limiting value has been reached without sparks):

An aluminum sheet shield is mounted on the indicator of the meter, which may move between the pole shoes of two oppositely positioned repeating coils. As soon as the shield moves into the air gap of the two induction coils because the limiting value has been exceeded, the coils are uncoupled and the oscillations of the vacuum tube or transistor oscillator mounted on the meter cease. When the indicator moves back and the shield leaves the air gap, the oscillations resume. Depending on the current peak during the control or when sparks occur, the measuring mechanism of ammeter 350 receives impulses of different strength so that it depends on the current peak, which exceeds an adjusted limiting value, how long the interruption of the oscillations of the attached oscillator lasts.

When the oscillations are interrupted, the continuous charge of the condenser-resistance combination 550 is also interrupted. This also interrupts the continuous increase in the voltage of the pre-amplifier 650 and thus of the precipitator since the voltage on the condenser-resistance 550 determines the amount of the opening of the pre-amplifier.

The condenser 180 is larger than condenser 170 so that its discharge via the upper pre-magnetization coil of pre-amplifier 650 lasts longer than the discharge of condenser 170.

Condenser 170 is discharged via transistor 190 at the occurrence of each spark in the precipitator, which exceeds the limiting value. The condenser 180 thus supports the voltage which, for the moment, is not increased.

If larger sparks than the normal small "streaks" occur, the voltage of the condenser 180 also is decreased since the charge from condenser 170 remains interrupted for some time. This produces some decrease in the operating voltage of the precipitator. Condensers 170 and 180 are adjustable so that the best operating conditions may be obtained for each precipitator.

A further limiting value sensor in the voltmeter 450 at the primary or secondary serves to close the amplifier 650 via the central pre-magnetization coil immediately upon a sudden strong voltage drop due to arcing in the precipitator. This causes the voltage and the current supply in the precipitator immediately to drop toward zero, which absolutely prevents further arcing.

As soon as arcing has ceased and the voltage in the precipitator goes up again toward normal values, the closing of the pre-amplifier 650 also ceases and the control system acts again to raise the voltage toward the limiting value.

It will be obvious to the skilled in the art that the described and illustrated control elements may be replaced by equivalent suitable devices to obtain an optimum average collection efficiency of the electrical precipitator.

I claim:
1. In combination with an electrical precipitator having two electrodes connected to an A.C. power supply via a transformer and a rectifier, an automatic voltage control system comprising, in combination:

first limit sensor means for picking up excess current consumed by the precipitator due to the number and intensity of transient flashovers occurring during a given unit time;

second limit sensor means for picking up the increased voltage drop due to arcovers;

each of said sensor means incorporating an oscillator having two coupled induction coils which are physically spaced apart to form an air gap between themselves, a decoupling shield, and means for moving said shield into said air gap between said coils for decoupling the same from each other when the respective limit sensor picks up a value corresponding to the limit to which it is set, thereby to interrupt the oscillations of said oscillator;

two variable condensers;

rectifying and pre-amplifying for connecting the output of each of said sensor means to a respective one of said two condensers, in consequence of which the latter are continuously charged until such time as each respective sensor picks up a value corresponding to its set limit;

secondary circuit means for continuously disharging said condensers;

transductor means for amplying the discharge currents of said condensers; and means responsive to the condenser discharge currents for controlling the voltage of the precipitator.

2. The voltage control system of claim 1, wherein said shield is made of aluminum.

3. The voltage control system of claim 1, wherein the change of the charge on said condensers changes said precipitator voltage.

4. The voltage control system of claim 1, wherein the storage of the measured values for the number and intensity of the arcovers is effected by the amount of the discharge of the variable condensers, wherein the optimal operating voltage is set by changes in the capacitance of said condensers, wherein said pre-amplifying means incorporate means for varying the pre-magnetizing current, wherein said condensers are connected to variable discharge resistors, and wherein means are provided for varying said pre-magnetizing current and said resistors.

5. The voltage control system of claim 1, wherein said discharge means comprise a transistor for instantaneously discharging that one of said condensers connected to receive the output of said first sensor means.

6. The voltage control system of claim 1, wherein said discharge means comprise means for initiating the discharge of that of one said condensers which is connected to receive the output of said second sensor means upon the discharge of the other one of said condensers, said other condenser being connected to receive the output of said first sensor means.

7. The voltage control system of claim 1, wherein said two sensor means are connected to act on said pre-amplifying means, upon the occurrence of arcovers, in the same direction.

8. The voltage control system of claim 1, further comprising ohmic resistance elements for continuous charging and discharging the condensers.

9. The voltage control system of claim 1, wherein the actuation of the sensors interrupts the charging of the condensers.

10. The voltage control system of claim 9, wherein discharge of one of said condensers interrupts an increase in the voltage and initiates discharge of a main condenser.

11. The voltage control system of claim 10, wherein the discharge of the main condenser continues until the metered value falls below the set limiting value again.

12. The voltage control system of claim 1, wherein said sensors comprise sensing elements adjustable to determine the minimum voltage limiting value and the maximum current limiting value.

13. The voltage control system of claim 12, wherein said sensing elements actuate the voltage adjusting means in the same sense at the occurrence of arcing in the precipitator.

References Cited by the Examiner

UNITED STATES PATENTS

| 2,297,740 | 10/42 | Brown | 323—66 |
| 2,623,608 | 12/52 | Hall | 323—66 |
| 2,675,092 | 4/52 | Hall | 323—66 |
| 2,943,697 | 7/60 | Little | 323—66 |
| 2,992,699 | 7/61 | Jarvinen | 323—66 |

LLOYD McCOLLUM, *Primary Examiner.*

MILTON O. HIRSHFIELD, *Examiner.*